United States Patent
Fang et al.

(10) Patent No.: US 10,735,562 B2
(45) Date of Patent: Aug. 4, 2020

(54) PACKET DATA CONVERGENCE PROTOCOL (PDCP) INTEGRATION IN A WIRELESS NETWORK CENTRAL UNIT (CU)

(71) Applicant: Sprint Communications Company L.P., Overland Park, KS (US)

(72) Inventors: Zheng Fang, McLean, VA (US); Zheng Cai, Fairfax, VA (US); Yu Wang, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/941,511

(22) Filed: Mar. 30, 2018

(65) Prior Publication Data
US 2019/0306283 A1    Oct. 3, 2019

(51) Int. Cl.
| H04L 29/06 | (2006.01) |
| H04W 88/08 | (2009.01) |
| H04W 28/08 | (2009.01) |
| H04W 80/02 | (2009.01) |
| H04W 88/10 | (2009.01) |
| H04W 88/12 | (2009.01) |

(52) U.S. Cl.
CPC .......... *H04L 69/18* (2013.01); *H04W 28/08* (2013.01); *H04W 88/085* (2013.01); *H04W 80/02* (2013.01); *H04W 88/10* (2013.01); *H04W 88/12* (2013.01)

(58) Field of Classification Search
CPC ...... H04L 69/18; H04W 28/08; H04W 80/02; H04W 88/10; H04W 88/12
USPC .......................................................... 370/328
See application file for complete search history.

(56) References Cited

U.S. PATENT DOCUMENTS

| 9,775,045 | B2 | 9/2017 | Li et al. |
| 2014/0355444 | A1 | 12/2014 | Turtinen et al. |
| 2016/0073426 | A1 | 3/2016 | Bull et al. |
| 2017/0245316 | A1 | 8/2017 | Salkintzis |
| 2017/0295551 | A1 | 10/2017 | Sadiq et al. |
| 2017/0331670 | A1 | 11/2017 | Parkvall et al. |
| 2018/0007583 | A1 | 1/2018 | Hong et al. |
| 2018/0092085 | A1* | 3/2018 | Shaheen ............... H04W 28/08 |
| 2018/0205808 | A1* | 7/2018 | Yang .................. H04L 69/324 |

(Continued)

OTHER PUBLICATIONS

Katerina Smiljkovikj, et al; "Capacity Analysis of Decoupled Downlink and Uplink Access in 5G Heterogeneous Systems;" Oct. 27, 2014; pp. 1-26.

(Continued)

*Primary Examiner* — Yemane Mesfin
*Assistant Examiner* — Intekhaab A Siddiquee

(57) ABSTRACT

Central Unit (CU) circuitry in a wireless data network serves wireless User Equipment (UE) with an integrated Packet Data Convergence Protocol (PDCP). The CU circuitry receives downlink data from a Fifth Generation New Radio (5GNR) Service Data Adaption Protocol (SDAP) component. The CU circuitry executes the integrated PDCP to route the downlink data from the 5GNR SDAP component to an Institute of Electrical and Electronic Engineers 802.11 (WIFI) Radio Link Control (RLC) component. The CU circuitry receives uplink data from the WIFI RLC component. The CU circuitry executes the integrated PDCP to route the uplink data from the WIFI RLC receive memory to the 5 GNR SDAP component.

12 Claims, 10 Drawing Sheets

(56) References Cited

U.S. PATENT DOCUMENTS

2018/0367230 A1* 12/2018 Su .............................. H04J 1/08
2019/0150224 A1* 5/2019 Han .................... H04W 72/042
370/329

OTHER PUBLICATIONS

Erik Westerberg; "4G/5G RAN architecture, How a Split Can Make the Difference;" Ericsson Technology Review; Jul. 22, 2016; pp. 1-16; vol. 93; Ericsson AB; Stockholm, Sweden.
NGMN Alliance, "NGMN Overview on 5G RAN Functional Decomposition", ngmn the engine of broadband wireless innovation, Feb. 24, 2018, pp. 1-47, version 1.0, Reading Bridge House, England.

* cited by examiner

PACKET DATA CONVERGENCE PROTOCOL (PDCP) INTEGRATION IN A WIRELESS NETWORK CENTRAL UNIT (CU)

TECHNICAL BACKGROUND

Wireless data networks serve wireless User Equipment (UEs) with mobile data communication services like internet access, voice calling, and video calling. The wireless UEs could be computers, phones, headsets, graphic displays, vehicles, drones, or some other wireless communication apparatus. The wireless data networks have wireless access points that exchange user data and signaling over the air with these wireless UEs. The wireless access points include Distributed Unit (DU) circuitry. The DU circuitry uses network protocols like Fifth Generation New Radio (5G NR), Long Term Evolution (LTE), and Institute of Electrical and Electronic Engineers 802.11 (WIFI). The DU circuitry executes network software applications to process the user data responsive to the signaling. The network software applications comprise: Physical Layer (PHY), Media Access Control (MAC), Radio Link Control (RLC), Packet Data Convergence Protocol (PDCP), and Radio Resource Control (RRC). These network software applications drive the DU circuitry to exchange wireless user data and signaling with the wireless UEs.

The network software applications also drive the DU circuitry to exchange user data and signaling with Central Unit (CU) circuitry. The CU circuitry is embedded in the backhaul data path network between the DU circuitry in the wireless access points and the wireless network core. The CU circuitry executes a network software application that drive the CU circuitry to exchange user data and signaling with the DU circuitry in the wireless access points and with the wireless network core.

With the introduction of protocol slicing technology, some of the network software applications are moved from the DU circuitry in the wireless access points to the CU circuitry in the backhaul transport network. For example, the RRC and PDCP software applications have been moved from the DU circuitry in the wireless access points to the CU circuitry in the backhaul transport network. In another example, the MAC, RLC, RRC, and PDCP software applications were moved from the DU circuitry in the wireless access points to the CU circuitry in the backhaul transport network.

In addition to protocol slicing, Uplink/Downlink (UL/DL) de-coupling technology is used to separate the DU and CU circuitry on the UL and/or the DL. Thus, a wireless UE may get its UL from DU circuitry in an LTE evolved NodeB and get its DL from DU circuitry in an 5GNR 5G NodeB. Likewise, the UL for the wireless UE may traverse CU circuitry in one backhaul link, and the DL for the wireless UE may traverse different CU circuitry in another backhaul link.

LTE/WIFI Aggregation (LWA) uses both WIFI and LTE for wireless access. The WIFI RLC and the LTE RLC are both coupled to the LTE PDCP. Unfortunately, the LTE PDCP has not been optimized for 5GNR and CU circuitry. Likewise, the 5GNR PDCP has not been optimized for LTE and CU circuitry.

TECHNICAL OVERVIEW

Central Unit (CU) circuitry in a wireless data network serves wireless User Equipment (UE) with an integrated Packet Data Convergence Protocol (PDCP). The CU circuitry receives downlink data from a Fifth Generation New Radio (5GNR) Service Data Adaption Protocol (SDAP) component. The CU circuitry executes the integrated PDCP to route the downlink data from the 5GNR SDAP component to an Institute of Electrical and Electronic Engineers 802.11 (WIFI) Radio Link Control (RLC) component. The CU circuitry receives uplink data from the WIFI RLC component. The CU circuitry executes the integrated PDCP to route the uplink data from the WIFI RLC receive memory to the 5GNR SDAP component.

DETAILED DESCRIPTION

Figure 1:
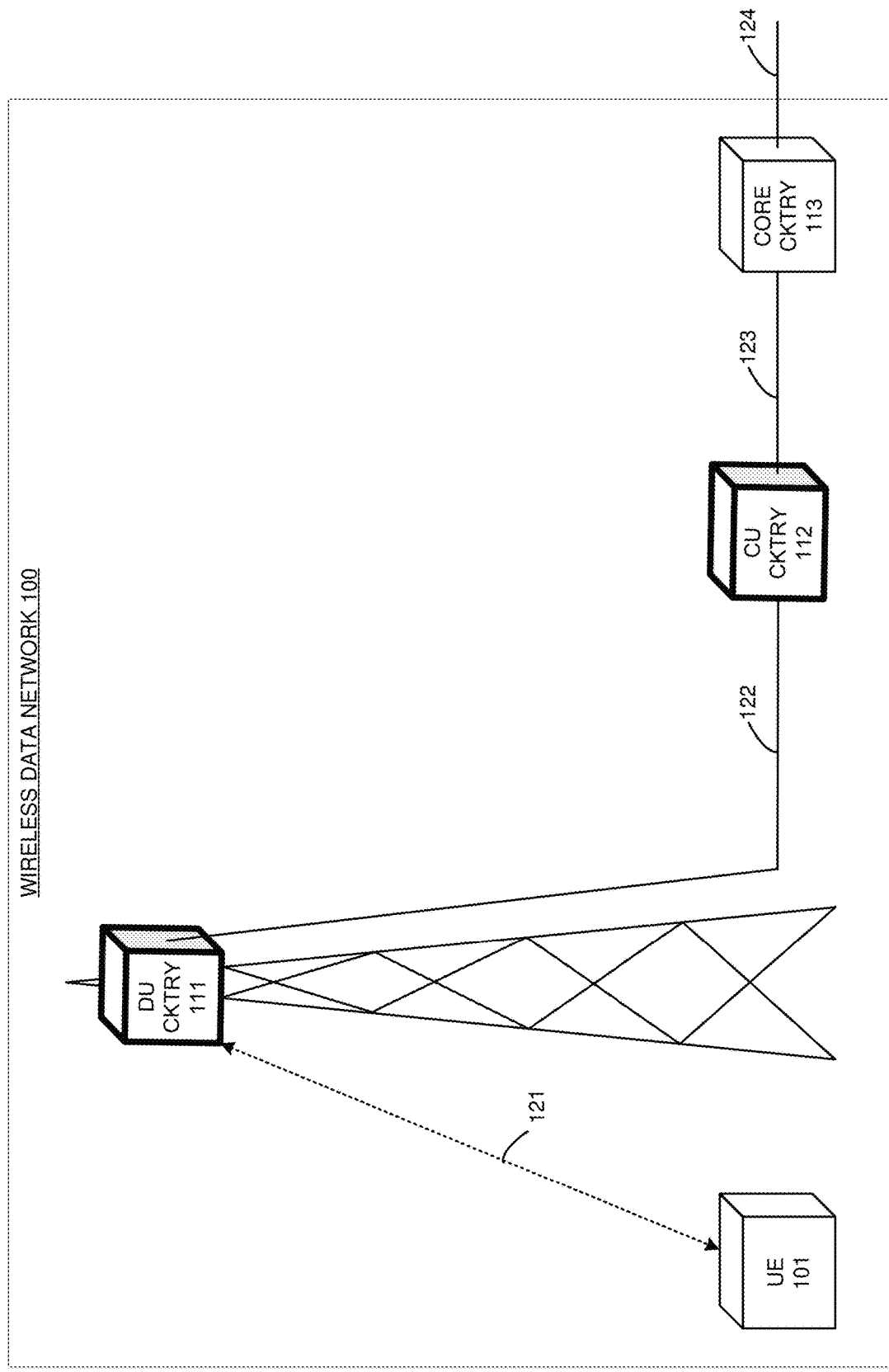
FIG. 1 illustrates a wireless data network that comprises Central Unit (CU) circuitry with an integrated multi-protocol Packet Data Convergence (PDCP) to serve wireless User Equipment (UE).

FIG. 1 illustrates wireless data network 100 that comprises Central Unit (CU) circuitry (cktry) 112 that has an integrated multi-protocol Packet Data Convergence (PDCP) to serve wireless User Equipment (UE) 101. Wireless data network 100 comprises wireless UE 101, Distributed Unit (DU) circuitry 111, CU circuitry 112, core circuitry 113, and data communication links 121-124. UE 101 could be a computer, phone, headset, graphic display, vehicle, drone, or some other wireless communication apparatus. UE 101 uses wireless network protocols like Fifth Generation New Radio (5G NR), Long Term Evolution (LTE), and Institute of Electrical and Electronic Engineers (IEEE) 802.11 (WIFI). UE 101 executes user applications like video streaming, virtual reality, machine communications, and internet access. DU circuitry 111 is shown on a single wireless access point at a single location in this example, but DU circuitry 111 may be distributed across multiple wireless access points.

UE 101 and DU circuitry 111 wirelessly exchange user data and network signaling over wireless links 121. DU circuitry 111 and CU circuitry 112 exchange user data and network signaling over data links 122. CU circuitry 112 and core circuitry 113 exchange user data and network signaling over data links 123. Core circuitry 113 and other systems (not shown) exchange the user data over data links 124. Data communication links 121 are wireless. Data communication links 122-124 may be wireless, wireline, or optical—including combinations thereof. Data communication links 122-124 may also include intermediate network elements.

DU circuitry 111 comprises wireless transceiver circuitry and baseband circuitry. The wireless transceiver circuitry comprises antennas, modulators, amplifiers, filters, digital/analog interfaces, Digital Signal Processors (DSPs), memory circuitry, firmware/software, and bus circuitry. The transceiver circuitry uses wireless network protocols like 5GNR, LTE, and WIFI. The baseband circuitry comprises Central Processing Unit (CPU) circuitry, memory circuitry, software, bus circuitry, and data communication circuitry. The software includes an operating system and modules for Physical Layer (PHY), Media Access Control (MAC), and typically Radio Link Control (RLC).

CU circuitry 112 comprises data communication circuitry and data processing circuitry. The data communication circuitry comprises DSPs, memory circuitry, firmware/software, and bus circuitry. The data processing circuitry comprises CPU circuitry, memory circuitry, software, and bus circuitry. The software includes an operating system and modules for Packet Data Convergence Protocol (PDCP), Service Data Adaption Protocol (SDAP), and Radio Resource Control (RRC).

Core circuitry 112 resides in network elements like Mobility Management Entities (MMEs), Home Subscriber Systems (HSS), Serving Gateways (S-GWs), Packet Data Network Gateways (P-GWs), Policy Charging Rules Functions (PCRFs), Internet Protocol Multimedia Subsystem (IMS) servers, and the like.

CU circuitry 112 comprises computer hardware and software that form a special-purpose machine—a wireless networking CU that processes user data with a single, integrated, multi-protocol PDCP. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into the special-purpose CU circuitry that is described herein.

In operation, core circuitry 113 receives Downlink (DL) data from various systems over data links 124 for delivery to UE 101. Core circuitry 113 has 5GNR network elements that transfer DL data for UE 101 to a 5GNR Service Data Application Protocol (SDAP) component in CU circuitry 112 over data links 123. The 5GNR network elements in core circuitry 113 transfer signaling for UE 101 to a 5GNR Radio Resource Control (RRC) component in CU circuitry 112 over data links 123. Core circuitry 113 also has LTE network elements that transfer DL data and signaling for UE 101 to an LTE RRC component in CU circuitry 112 over data links 123. Core circuitry 113 may be distributed, and the LTE network elements and the 5GNR network elements may occupy different locations.

In CU circuitry 112, the 5GNR RRC component establishes 5GNR RRC connections for UE 101. The LTE RRC component establishes LTE RRC connections for UE 101. The LTE and 5GNR RRC components support Non-Access Stratum (NAS) messaging between UE 101 and an MME in core circuitry 113. The LTE and 5GNR RRC components may signal the PDCP layer to control the multi-protocol routing within the integrated PDCP module. The 5GNR SDAP component maps Quality-of-Service (QoS) and adds QoS markers to the DL data that it stores in the 5GNR RRC receive memory. The 5GNR RRC component transfers signaling for UE 101 to the 5GNR RRC receive memory. The LTE RRC component transfers DL data and signaling for UE 101 to an LTE RRC receive memory.

CU circuitry 112 executes its PDCP module and responsively adds sequence numbering to the DL data. CU circuitry 112 also executes the integrated PDCP module and responsively compresses DL headers in the DL data. The compression may use Robust Header Compression (RoHC) or some other technique. CU circuitry 112 executes its PDCP module and responsively performs DL ciphering and security tasks.

Advantageously, CU circuitry 112 executes its PDCP module and responsively routes the DL data and signaling for UE 101 from the 5GNR RRC receive memory to: 1) a 5GNR RLC transmit memory, 2) an LTE RLC transmit memory, and/or 3) a WIFI RLC transmit memory. CU circuitry 112 executes its PDCP module and responsively routes DL data and signaling for UE 101 from the LTE RRC receive memory to: 1) the 5GNR RLC transmit memory, 2) the LTE RLC transmit memory, and/or 3) the WIFI RLC transmit memory.

CU circuitry 112 then transmits DL data and signaling for UE 101 from the WIFI RLC transmit memory to a WIFI RLC component in DU circuitry 111. CU circuitry 112 transmits DL data and signaling for UE 101 from the LTE RLC transmit memory to an LTE RLC component in DU circuitry 111. CU circuitry 112 transmits DL data and signaling for UE 101 from the 5GNR RLC transmit memory to a 5GNR RLC component in DU circuitry 111. Note that DU circuitry 111 is geographically distributed across different wireless access points in some examples.

In DU circuitry 111, the WIFI RLC component receives DL data and signaling from the WIFI RLC transmit memory in CU circuitry 112. The WIFI RLC component transfers DL data and signaling to a WIFI MAC component. The WIFI MAC component transfers DL data and signaling to the WIFI PHY component. The WIFI PHY component drives DU circuitry 111 to wirelessly transfer DL data and signaling to UE 101 over the WIFI DL in wireless communication links 121.

The LTE RLC component in DU circuitry 111 receives DL data and signaling from the LTE RLC transmit memory in CU circuitry 112. The LTE RLC component transfers DL data and signaling to an LTE MAC component. The LTE MAC component transfers DL data and signaling to the LTE PHY component. The LTE PHY component drives DU circuitry 111 to wirelessly transfer DL data and signaling to UE 101 over the LTE DL in wireless data communication links 121.

The 5GNR RLC component in DU circuitry 111 receives DL data and signaling from the 5GNR RLC transmit memory in CU circuitry 112. The 5GNR RLC component transfers DL data and signaling to a 5GNR MAC component. The 5GNR MAC component transfers DL data and signaling to the 5GNR PHY component. The 5GNR PHY component drives DU circuitry 111 to wirelessly transfer DL data and signaling to UE 101 over the 5GNR DL in wireless data communication links 121.

On the Uplink (UL), DU circuitry 111 receives UL data and signaling from UE 101 over the WIFI UL in wireless communications links 121. The WIFI PHY component processes the UL data and signaling from the WIFI UL and transfers UL data and signaling to a WIFI MAC component. The WIFI MAC transfers UL data and signaling to the WIFI RLC component. The WIFI RLC component in DU circuitry 111 transfers UL data and signaling to the WIFI RLC receive memory in CU circuitry 112.

DU circuitry 111 also receives UL data and signaling from UE 101 over the LTE UL in wireless communications links 121. The LTE PHY component transfers UL data and signaling to a LTE MAC component. The LTE MAC component transfers UL data and signaling to the LTE RLC component. The LTE RLC component in DU circuitry 111 transfers UL data and signaling to the LTE RLC receive memory in CU circuitry 112.

DU circuitry 111 also receives UL data and signaling from UE 101 over the 5GNR UL in wireless communications links 121. The 5GNR PHY component transfers UL data and signaling to the 5GNR MAC component. The 5GNR MAC component transfers UL data and signaling to the 5GNR RLC component. The 5GNR RLC component in DU circuitry 111 transfers UL data and signaling to the 5GNR RLC receive memory in CU circuitry 112.

CU circuitry 112 receives UL data and signaling from the WIFI RLC component in DU circuitry 111. CU circuitry 112 stores the UL data and signaling in the WIFI RLC receive memory. CU circuitry 112 receives UL data and signaling from the LTE RLC component in DU circuitry 111. CU circuitry 112 stores this UL data and signaling in the LTE RLC receive memory. CU circuitry 112 receives UL data and signaling from the 5GNR RLC component in DU circuitry 111. CU circuitry 112 stores this UL data and signaling in the 5GNR RLC receive memory.

CU circuitry 112 executes the integrated PDCP module and responsively de-compresses UL headers in the UL data from the RLC receive memories. CU circuitry 112 executes its integrated PDCP module and responsively re-sequences the UL data based on sequence numbering inserted by the PDCP layer in UE 101. Advantageously, the PDCP module in CU circuitry 112 re-sequences UL data across all protocols (5GNR, LTE, WIFI) regardless of their particular protocol. For the same IP flow, the PDCP module may receive packets #1 and #5 from the 5GNR RLC, receive packets #2 and #4 from the LTE RLC, and receive packets #3 and #6 from the WIFI RLC. The PDCP module performs SDAP functions for the packets like QoS mapping and marking. The PDCP module then routes the packets through the PDCP layer in order from 1-5.

Advantageously, CU circuitry 112 also executes its integrated PDCP module and responsively routes UL data and signaling from the WIFI RLC receive memory to an LTE RRC transmit memory and/or a 5GNR RRC transmit memory. CU circuitry 112 executes its integrated PDCP module and responsively routes UL data and signaling from the LTE RLC receive memory to the LTE RRC transmit memory and/or the 5GNR RRC transmit memory. CU circuitry 112 executes its integrated PDCP module and responsively routes UL data and signaling from the 5GNR RLC receive memory to the LTE RRC transmit memory and/or the 5GNR RRC transmit memory.

CU circuitry 112 transmits UL data and signaling from the LTE RRC transmit memory to the LTE RRC component in CU circuitry 112. The LTE RRC component transfers UL data and signaling to LTE network elements in core circuitry 113 over data links 123. The LTE network elements in core circuitry 113 transfer the UL data to various systems over data links 124. CU circuitry 112 transmits signaling from the 5GNR RRC transmit memory to the 5GNR RRC component in circuitry 112. The 5GNR RRC component transfers signaling to the 5GNR network elements in core circuitry 113 over data links 123. CU circuitry 112 transmits UL data from the 5GNR RRC transmit memory to the 5GNR SDAP component in circuitry 112. The 5GNR SDAP component transfers UL data to the 5GNR network elements in core circuitry 113 over data links 123. The 5GNR network elements in core circuitry 113 transfer the UL data to various systems over data communication links 124.

Advantageously, CU circuitry 112 may process the PDCP module to perform load balancing on the DL and/or the UL. For example, the PDCP module may compare the 5GNR DL data load to a threshold and route overflow DL data to the WIFI RLC or the LTE RLC for delivery to UE 101. Likewise, the PDCP module may compare the WIFI DL data load to a threshold and route overflow DL data to the LTE RLC or the 5GNR RLC for delivery to UE 101. On the UL, the PDCP module may compare the LTE UL data load to a threshold and route overflow UL data to the 5GNR RRC for delivery to core circuity 113. Likewise, the PDCP module may route overflow 5GNR UL data to the LTE RRC for delivery to core circuity 113. Numerous load balancing tasks could be preformed in a similar manner.

Advantageously, CU circuitry 112 may process the PDCP module to route the DL data and the UL data responsive to signaling. For example, the LTE RRC component may signal the integrated PDCP module to route a specific IP UL/DL flow between the 5GNR RLC and the LTE RRC. In another example, the 5GNR RRC component may signal the integrated PDCP module to route a specific IP UL/DL flow between the WIFI RLC and the 5GNR LTE RRC. For UL/DL de-coupling, the LTE RRC component may signal the integrated PDCP module to route a specific IP UL flow between the WIFI 5GNR RLC and the 5GNR SDAP and to route the corresponding IP DL flow between the LTE RRC and the 5GNR RLC. In addition to the RRC, the SDAP, RLC, or MAC components may also control the PDCP routing with signaling in a like manner. In addition to the CU components, external systems like UE 101 or an MME may also control the PDCP routing with signaling as well. For example, the PDCP component in UE 101 may signal the integrated PDCP component in CU circuitry 112 to stop using WIFI altogether and route the existing data flows over LTE and 5GNR. Various multi-protocol routes could be implemented by signaling in the integrated multi-protocol PDCP layer of CU circuitry 112.

Figure 2:
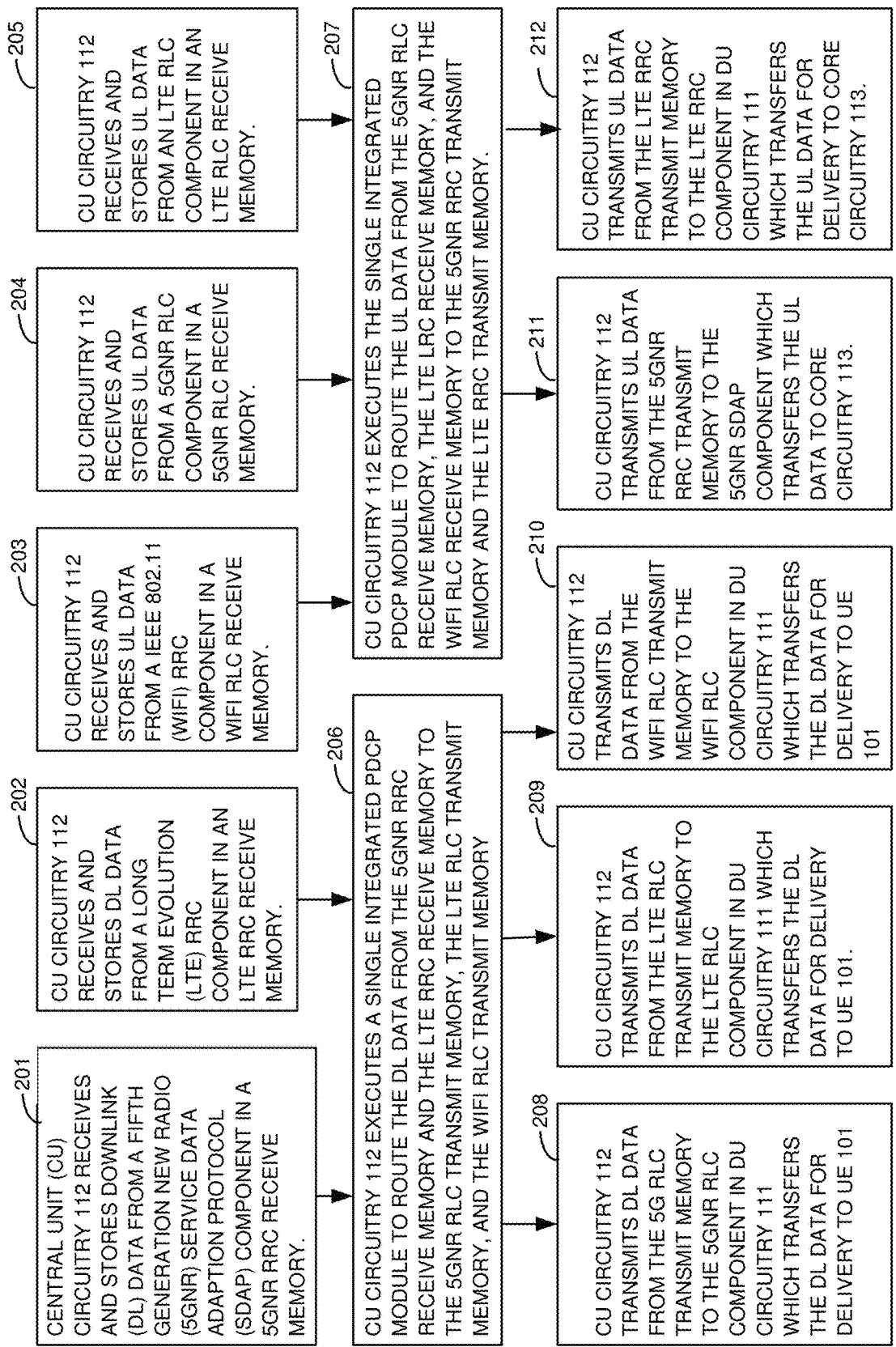
FIG. 2 illustrates the operation of the CU circuitry comprising the integrated multi-protocol PDCP to serve the wireless UE.

FIG. 2 illustrates the operation of CU circuitry 112 comprising the integrated multi-protocol PDCP to serve wireless UE 101. For the Downlink (DL), CU circuitry 112 receives and stores DL data from a Fifth Generation New Radio (5GNR) Service Data Adaption Protocol (SDAP) component in a 5GNR RRC receive memory (201). CU circuitry 112 receives and stores DL data from a Long Term Evolution (LTE) RRC component in a LTE RRC receive memory (202). For the Uplink (UL), CU circuitry 112 receives and stores UL data from an IEEE 802.11 (WIFI) Radio Link Control (RLC) component in a WIFI RLC receive memory (203). CU circuitry 112 receives and stores UL data from a 5GNR RLC component in an 5GNR RLC receive memory (204). CU circuitry 112 receives and stores UL data from a LTE RLC component in a LTE RLC receive memory (205).

CU circuitry 112 executes its integrated PDCP module and responsively routes the DL data from the 5GNR RRC receive memory and the LTE RRC receive memory to the 5GNR RLC transmit memory, the LTE RLC transmit memory, and/or the WIFI RLC transmit memory (206). CU circuitry 112 also executes its integrated PDCP module and responsively routes the UL data from the 5GNR RLC receive memory, the LTE RLC receive memory, and the WIFI RLC receive memory to the 5GNR RRC transmit memory and/or the LTE RRC transmit memory (207).

CU circuitry 112 transmits DL data from the 5GNR RLC transmit memory to a 5GNR RLC component which transfers the DL data through a 5GNR MAC and PHY for wireless delivery to UE 101 (208). CU circuitry 112 transmits DL data from the LTE RLC transmit memory to an LTE RLC component which transfers the DL data through an LTE MAC and PHY for wireless delivery to UE 101 (209). CU circuitry 112 transmits DL data from the WIFI RLC transmit memory to a WIFI RLC component which transfers the DL data through a WIFI MAC and PHY for wireless delivery to UE 101 (210).

CU circuitry 112 transmits UL data from the 5GNR RRC transmit memory to a 5GNR SDAP component which transfers the UL data to core circuitry 111 (211). CU circuitry 112 transmits UL data from the LTE RRC transmit memory to an LTE RRC component which transfers the UL data to core circuitry 111 (212). Advantageously, multi-protocol routes for individual IP flows are implemented by the integrated multi-protocol PDCP module in CU circuitry 112.

Figure 3:
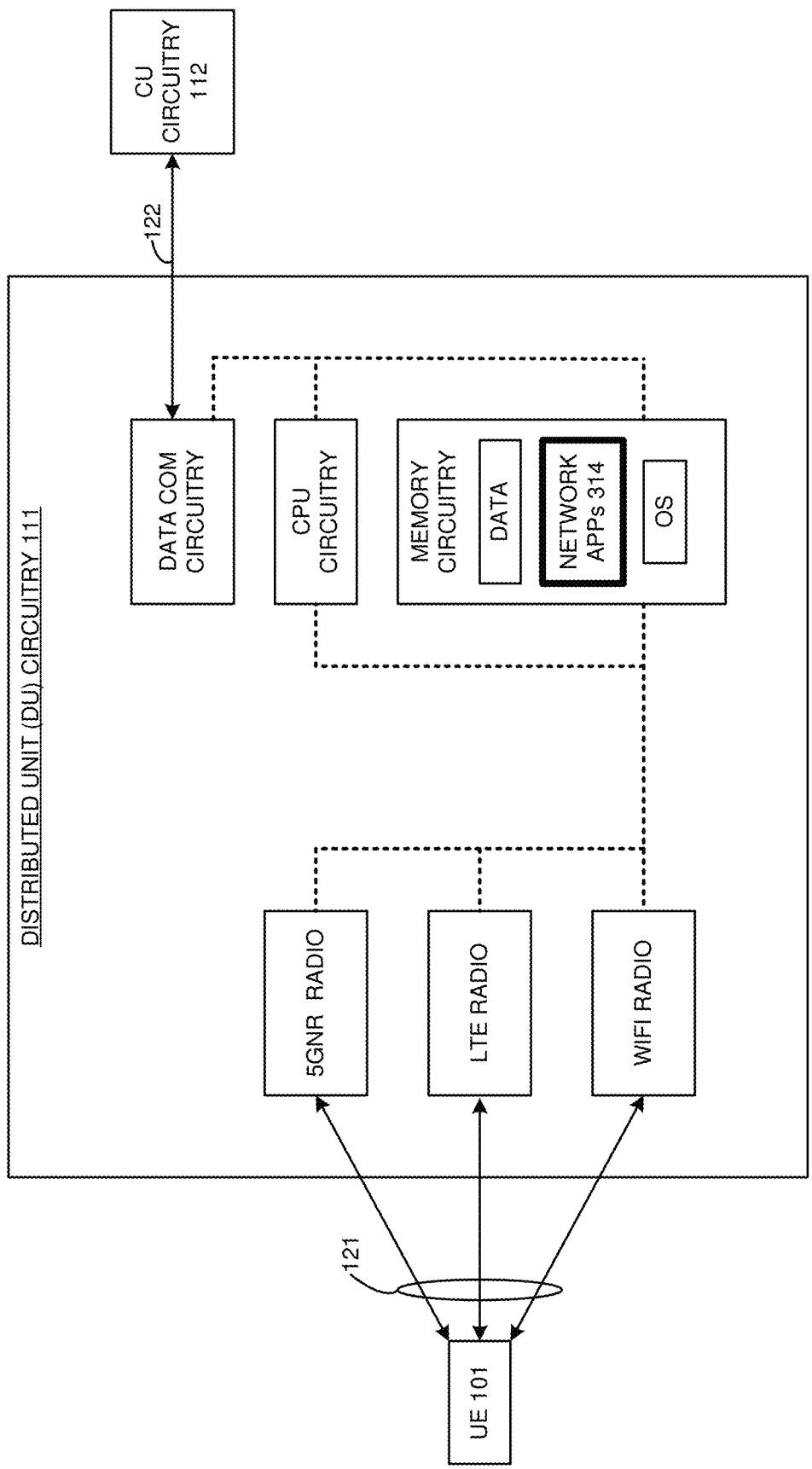
FIG. 3 illustrates Distributed Unit (DU) circuitry that exchanges data between the wireless UE and the CU circuitry.

FIG. 3 illustrates Distributed Unit (DU) circuitry 111 that exchanges data between wireless UE 101 and CU circuitry 112. DU circuitry 111 comprises a 5GNR radio, LTE radio, WIFI radio, memory circuitry, CPU circuitry, and data com circuitry that that are coupled by bus links. The bus links are indicated by dotted lines. Although shown together, the LTE/WIFI radios, and some memory circuitry, CPU circuitry, and data com circuitry could reside in an LTE eNodeB while the 5GNR radio, and some of the memory circuitry, CPU circuitry, and data com circuitry reside in a 5GNR gNodeB. The radios comprise antennas, duplexers, modulators, filters, amplifiers, analog-to-digital converters, digital-to-analog converters, DSP circuitry, memory, and bus links. The radio memories store data and DSP firmware/software. In the radios, the DSP circuitry drives the wireless exchange of the data with wireless UE 101 over wireless link 121. The memory circuitry stores data, operating system software (OS), and network software applications (APPs) 314. The data com circuitry comprises data networking circuitry that supports communications over Ethernet, IP, X2, S1-C, S1-U, and the like. The CPU circuitry executes the operating system and network applications 314 to control the exchange of the data between UE 101 and CU circuitry 112.

In the radios, the antennas receive wireless UL signals over wireless link 121 and transfer corresponding electrical UL signals through the duplexers to the amplifiers. The amplifiers boost the UL signals for the filters which attenuate unwanted energy. Demodulators down-convert the UL signals from their carrier frequencies. Analog-to-Digital circuits convert the analog UL signals into digital UL signals for the radio DSP circuitry. The radio DSP circuitry recovers UL data and signaling from the UL signals and transfers the recovered UL data and signaling to the memory circuitry. The CPU circuitry executes the OS to process UL data and signaling in the memory circuitry through network applications 314. Network applications 314 direct the CPU circuitry to transfer UL data and signaling through the data com circuitry and over data links 122 to CU circuitry 112.

In DU circuitry 111, the data com circuitry receives DL data and signaling from CU circuitry 111 over data links 122. The CPU circuitry executes the OS to process DL data and signaling through network applications 314. Network applications 314 direct the CPU circuitry to transfer DL data and signaling from the memory circuitry to the radios for wireless delivery to UE 101. In the radios, the DSP circuitry retrieves the DL data and signaling and transfers corresponding DL signals to the Digital-to-Analog convertors. The Digital-to-Analog convertors convert the DL signals into analog DL signals for the modulators. The modulators up-convert the DL signals to their carrier frequencies. The amplifiers boost the UL signals for the filters which attenuate unwanted out-of-band energy. The filters transfer the DL signals through the duplexers to the antennas. The electrical DL signals drive the antennas to emit corresponding wireless DL signals to UE 101 over wireless link 121.

Figure 4:
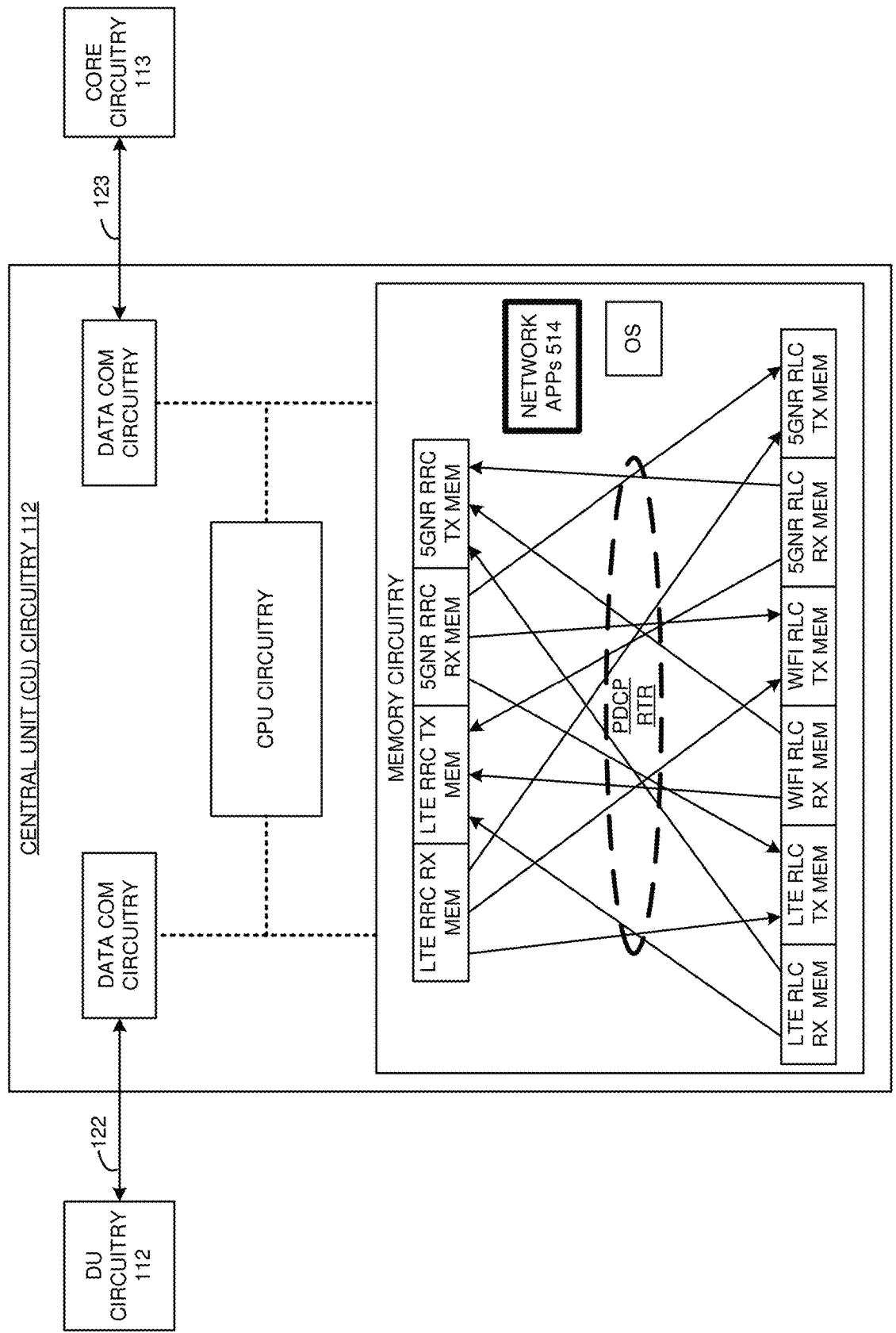
FIG. 4 illustrates the CU circuitry that has an integrated the multi-protocol PDCP.

FIG. 4 illustrates CU circuitry 112 that has an integrated multi-protocol PDCP. CU circuitry 112 comprises data com circuitry, CPU circuitry, memory circuitry, and bus interfaces (dotted lines). The data com circuitry supports Ethernet, IP, X2, S1-C, S1-U, and the like. The memory circuitry stores operating system software and network applications 514 and further comprises: 5GNR RRC receive/transmit memories, LTE RRC receive/transmit memories, 5GNR RLC receive/transmit memories, LTE RLC receive/transmit memories, and WIFI RLC receive/transmit memories. In CU circuitry 112, the CPU circuitry executes the operating system and network applications 514 to control the exchange of the data and signaling between DU circuitry 112 and core circuitry 113. Advantageously, network applications 514 comprise an integrated PDCP module that has a PDCP router (RTR) that routes the UL/DL data and signaling between the various receive/transmit memories in the memory circuitry.

In operation, CU data com circuitry receives UL data and signaling over data links 122 from DU circuitry 112. The CU data com circuitry loads the UL data and signaling into the 5GNR/LTE/WIFI RLC receive memories in the memory circuitry. The CPU circuitry executes the operating system to process the UL data through network applications 514. The PDCP module in network applications 514 directs the CPU circuitry to route the UL data and signaling from the 5GNR/LTE/WIFI RLC receive memories to the 5GNR/LTE RRC transmit memories per an internal PDCP routing data structure. The PDCP data structure correlates individual IP address/port combinations (or some other header information) for individual UL flows with individual RLC/RRC memory combinations. Thus, an IP address/port combination for an individual UL flow might be correlated with the 5GNR RLC receive memory and the LTE RRC transmit memory. The data port circuitry transfers UL data and signaling from the 5GNR and LTE RRC transmit memories over data links 123 to core circuitry 113.

The data com circuitry also receives DL data and signaling over data links 123 from core circuitry 113. The data com circuitry loads the DL data and signaling into the 5GNR and LTE RRC receive memories in the memory circuitry. The CPU circuitry executes the operating system to process DL data and signaling through network applications 514. The PDCP module in network applications 514 directs the CPU circuitry to route DL data and signaling from the 5GNR and LTE RRC receive memories to the 5GNR/LTE/WIFI RLC transmit memories per its internal data structure. The data structure might correlate individual IP address/port combinations for individual DL IP flows with individual RRC/RLC memory combinations. Thus, an IP address/port for an individual DL flow might be correlated with the LTE RRC receive memory and the 5GNR RLC transmit memory. Network applications 514 direct the CPU circuitry to transfer DL data and signaling from the 5GNR/LTE/WIFI transmit memories in memory circuitry to the data com circuitry for transfer over data link 122 to DU circuitry 111.

Figure 5:
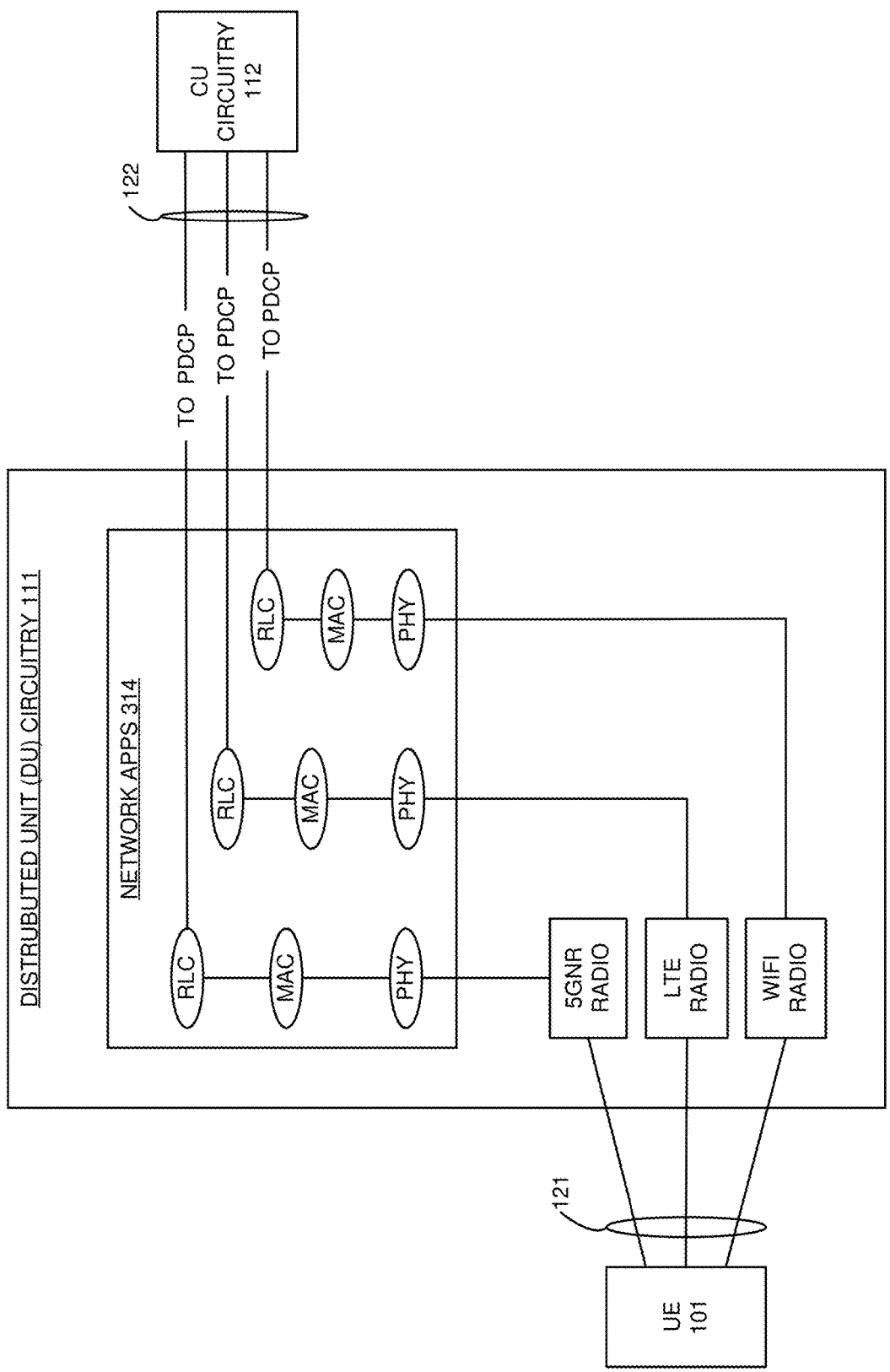
FIG. 5 illustrates the DU circuitry that exchanges user data between the wireless UE and the CU circuitry.

FIG. 5 illustrates another view of DU circuitry 111 that exchanges data between wireless UE 101 and CU circuitry 112. Network applications 314 comprise PHY modules, MAC modules, and RLC modules. The PHY, MAC, and RLC modules that are being executed by the CPU circuitry in DU circuitry 111 are referred to as PHY, MAC, and RLC components. For the UL, the 5GNR PHY component processes UL data and signaling to map between physical channels on wireless link 121 and 5GNR MAC transport channels. The 5GNR PHY component transfers processing for the UL data and signaling to the 5GNR MAC component.

The 5GNR MAC component processes UL data and signaling to map between the MAC transport channels and MAC logical channels. The 5GNR MAC component also processes UL data and signaling from UE 101 to identify buffer status, power headroom, channel quality, Hybrid Automatic Repeat Request (HARQ) acknowledgements, UE identifiers, and the like. To perform HARQ on the UL, the 5GNR MAC component transfers ACKs for UL data and signaling to UE 101. To perform random access, the 5GNR MAC component processes access signaling from UE 101 to identify UE 101 and initiate scheduling for UE 101. To perform power control, the 5GNR MAC component processes channel quality and power headroom to signal UE 101 and adjust UE power to overcome poor channel quality within headroom and interference limits. To perform scheduling, the 5GNR MAC component processes radio channel quality, buffer status, and radio interference to assign UL data and signaling to wireless payloads that comprise combinations of time-period and frequency-band called resource blocks. The 5GNR MAC component signals the UL schedule to UE 101. In most cases, the 5GNR MAC component processes performance data like data-rate, delay, error-rate, and jitter to maintain UL Quality-of-Service (QoS) for the 5GNR UL in wireless links 121. The 5GNR MAC component transfers processing for the UL data and signaling to the 5GNR RLC component in DU circuitry 111.

The 5GNR RLC component maps between the MAC logical channels and Protocol Data Units (PDUs) or Radio Bearers (RBs). The 5GNR RLC component performs ARQ for the UL data and signaling by transferring UL ACKs to UE 101. The 5GNR RLC component transfers processing for the UL data and signaling to UL PDCP component in CU circuitry 112 over data links 122.

The LTE PHY component processes the UL data and signaling to map between physical channels on wireless link 121 and LTE MAC transport channels. The LTE PHY component transfers processing for the UL data and signaling to the LTE MAC component. The LTE MAC component processes the UL data and signaling to map between the LTE MAC transport channels and MAC logical channels. The LTE MAC component also processes the UL data and signaling from UE 101 to identify buffer status, power headroom, channel quality, HARQ acknowledgements, UE identifiers, and the like. To perform HARQ on the UL, the LTE MAC component transfers ACKs for UL data and signaling for to UE 101. To perform random access, the LTE MAC component processes access signaling from UE 101 to identify UE 101 and initiate scheduling for UE 101. To perform power control, the LTE MAC component processes channel quality and power headroom to adjust UE power to overcome poor channel quality within headroom and interference limits. To perform scheduling, the LTE MAC component processes radio channel quality, buffer status, and radio interference to assign UL data and signaling to wireless payloads. The LTE MAC component signals the UL schedule to UE 101. In most cases, the LTE MAC component processes performance data like data-rate, delay, error-rate, and jitter to maintain UL QoS for the LTE UL in wireless links 121. The LTE MAC component transfers processing for the UL data and signaling to the LTE RLC component in DU circuitry 111.

The LTE RLC component maps between the MAC logical channels and PDUs or RBs. The 5GNR RLC component performs ARQ for the UL data and signaling by transferring UL ACKs to UE 101. The LTE RLC component transfers processing for the UL data and signaling to UL PDCP component in CU circuitry 112 over data links 122.

The WIFI PHY component processes the UL data and signaling to map between physical channels on wireless link 121 and WIFI MAC transport channels. The WIFI PHY component transfers processing for the UL data and signaling to the WIFI MAC component. The WIFI MAC component processes the UL data to map between the WIFI MAC transport channels and MAC logical channels. The LTE MAC component transfers processing for the UL data and signaling to the LTE RLC component in DU circuitry 111. The WIFI RLC component maps between the MAC logical channels and PDUs or RBs. The WIFI RLC component transfers processing for the UL data and signaling to UL PDCP component in CU circuitry 112 over data links 122.

For the DL, 5GNR RLC component performs ARQ for the DL data and signaling by retransmitting DL data and signaling that was not properly received by UE 101. The 5GNR RLC component transfers processing for the DL data and signaling to the 5GNR MAC component. The 5GNR MAC component processes the DL data and signaling to map between the MAC logical channels and 5GNR MAC transport channels. The 5GNR MAC component performs scheduling, power control, random access, and HARQ. To perform scheduling, the 5GNR MAC component processes radio channel quality, buffer status, and radio interference to assign DL data and signaling to 5GNR resource blocks. In most cases, the 5GNR MAC component processes performance data like data-rate, delay, error-rate, and jitter to maintain QoS on the 5GNR DL in wireless links 121. To perform HARQ, the 5GNR MAC component retransmits DL data and signaling that was not properly received by UE 101. The 5GNR MAC component transfers processing for the DL data and signaling to the 5GNR PHY. The 5GNR PHY component processes the DL data and signaling to map between the 5GNR MAC transport channels and the physical 5GNR DL channels on wireless links 121. The 5GNR PHY component transfers processing for the DL data and signaling to the operating system.

The LTE RLC component performs ARQ for the DL data and signaling by retransmitting DL data and signaling that was not properly received by UE 101. The LTE RLC component transfers processing for the DL data and signaling to the LTE MAC component. The LTE MAC component processes DL data and signaling to map between the MAC logical channels and LTE MAC transport channels. The LTE MAC component performs scheduling, power control, random access, and HARQ. To perform scheduling, the LTE MAC component processes radio channel quality, buffer status, and radio interference to assign DL data and signaling to LTE resource blocks. In most cases, the LTE MAC component processes performance data like data-rate, delay, error-rate, and jitter to maintain QoS on the LTE DL in wireless links 121. To perform HARQ, the LTE MAC component retransmits DL data and signaling that was not properly received by UE 101. The LTE MAC component transfers processing for the DL data and signaling to the LTE PHY component. The LTE PHY component processes the DL data and signaling to map between the LTE MAC transport channels and the physical LTE DL channels on wireless links 121. The LTE PHY component transfers processing for the DL data and signaling to the OS.

Figure 6:
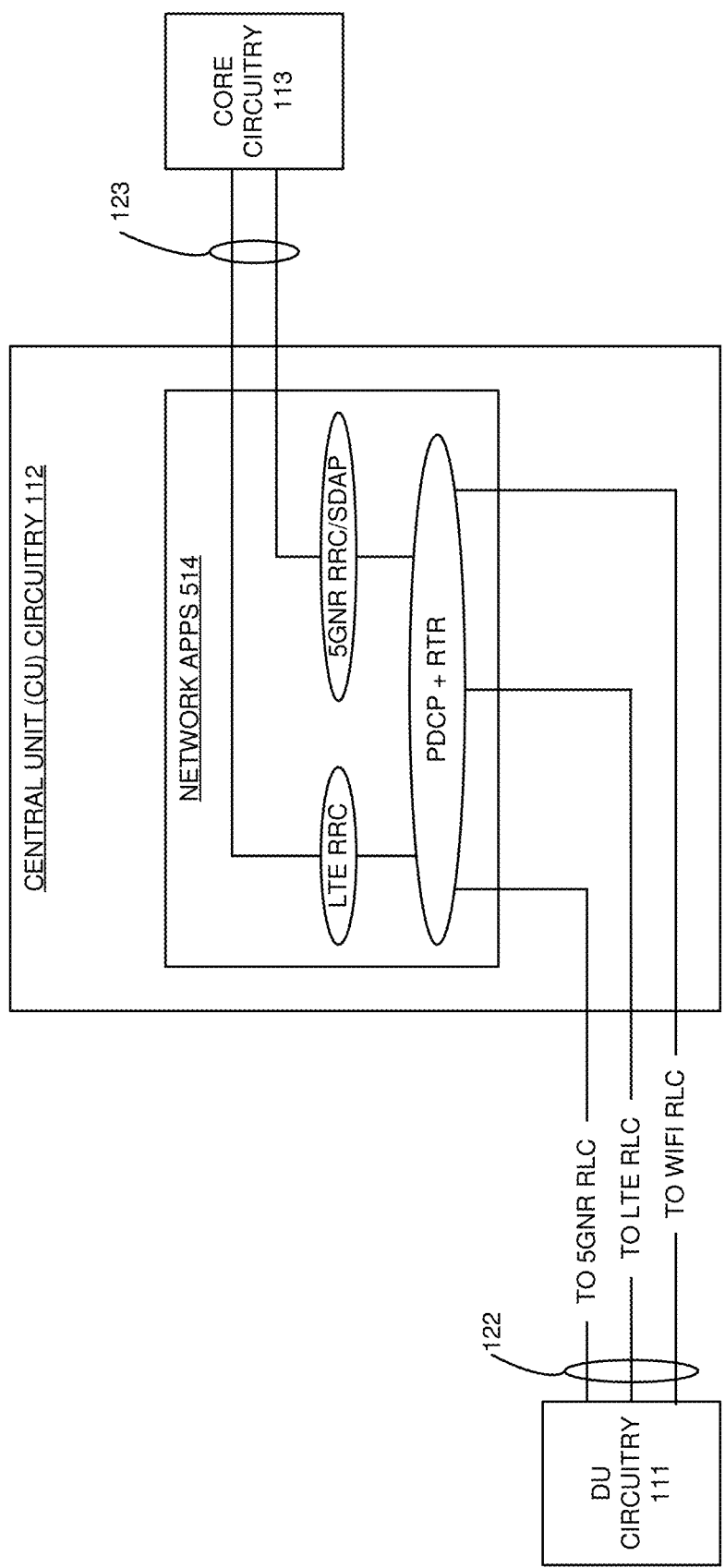
FIG. 6 illustrates the CU circuitry with the integrated multi-protocol PDCP.

FIG. 6 illustrates another view of CU circuitry 112 that has the integrated multi-protocol PDCP. Network applications 514 comprise an integrated multi-protocol PDCP module, a 5GNR RRC/SDAP module, and an LTE RRC module. The PDCP, SDAP, and RRC modules that are being executed by CU circuitry 112 are referred to as a PDCP component, SDAP components, and RRC components. Advantageously, the PDCP component includes a multi-protocol router (RTR).

For the UL, the PDCP component maps between the PDUs and RBs from the WIFI/LTE/5GNR RLC components and Service Data Units (SDUs) for the LTE/5GNR RRC/SDAP components. Advantageously, the PDU-RB/SDU mapping by the PDCP component implements various multi-protocol routings. The PDCP component handles security by applying ciphering. The PDCP component performs header decompression for the UL data from UE 101. The PDCP component orders the SDUs in their proper sequence across all protocols and eliminates duplicate UL data across all protocols. The PDCP component transfers processing for the UL data and signaling to the 5GNR/LTE RRC/SDAP components.

The LTE RRC component establishes LTE RRC connections for UE 101. The LTE RRC component supports Non-Access Stratum (NAS) messaging between UE 101 and core circuitry 113. The 5GNR RRC/SDAP component establishes 5GNR RRC connections for UE 101. The 5GNR RRC/SDAP component also supports NAS messaging between UE 101 and core circuitry 113. The 5GNR RRC/SDAP component marks UL data for QoS and transfers the UL data to core circuitry 113 over data links 123.

The LTE RRC component and the 5GNR RRC/SDAP component receive DL data and signaling from core circuitry 113. The LTE RRC component and the 5GNR RRC/SDAP component transfer system information to UE 101. The LTE RRC component and the 5GNR RRC/SDAP component handle paging for UE 101. The 5GNR RRC/SDAP component marks the 5GNR UL data for QoS. The LTE RRC component and the 5GNR RRC/SDAP component transfer processing for the DL data and signaling to the integrated PDCP component.

For the DL data, the PDCP component maps between the SDUs from the RRC/SDAP components and the PDUs/RBs for the RLC components. Advantageously, the SDU/PDU mapping by the PDCP component implements various multi-protocol routings. The PDCP component performs header compression for the DL data. The PDCP component orders the PDUs in their proper sequence and eliminates duplicate DL data across all protocols. The PDCP component transfers DL data and signaling to the 5GNR/LTE/WIFI RLC components in DU circuitry 111.

Figure 7:
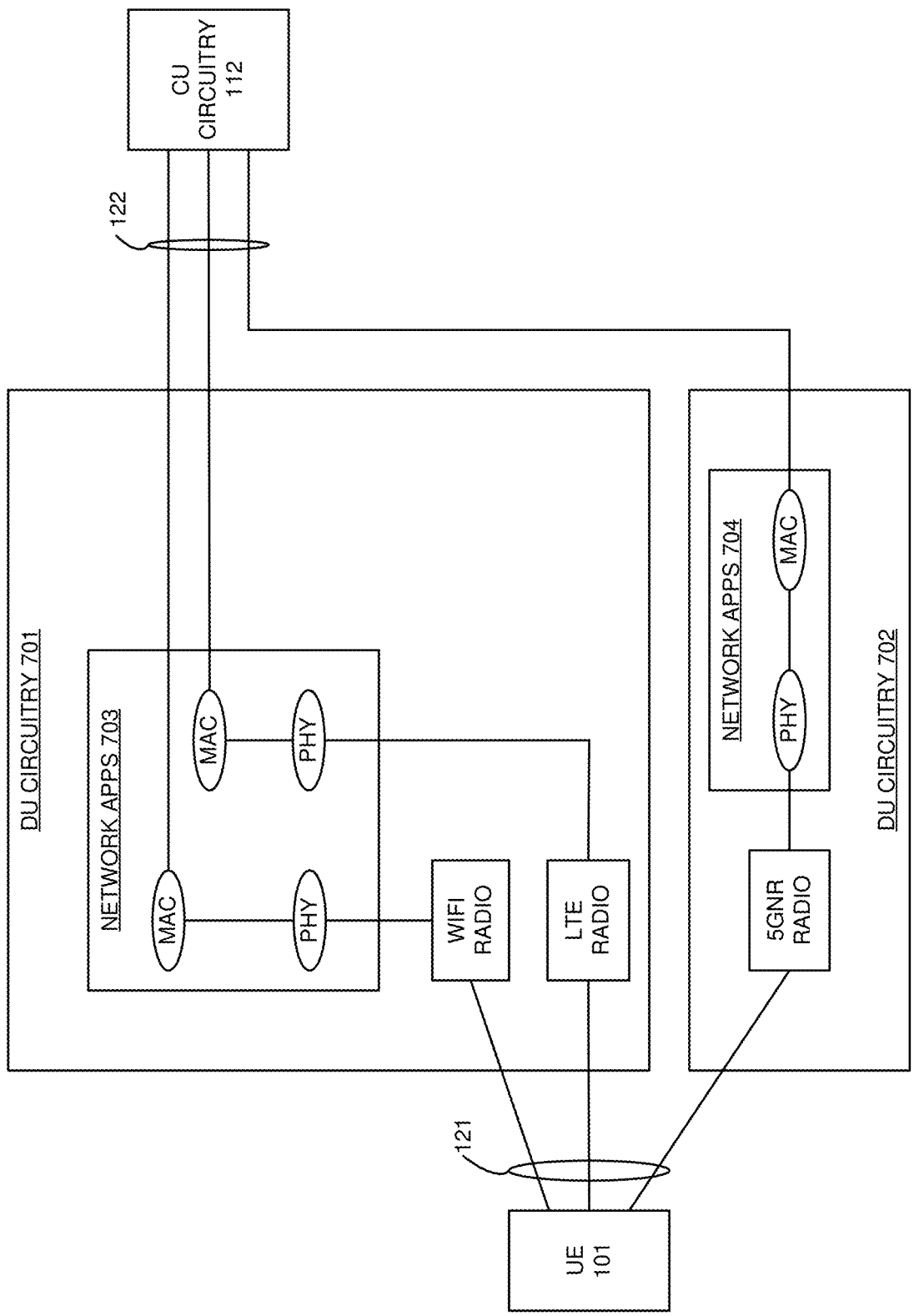
FIG. 7 illustrates alternative DU circuitry.

FIG. 7 illustrates alternative DU circuitry 701-702 that exchanges data between wireless UE 101 and CU circuitry 112. The WIFI and LTE radios reside in DU circuitry 701. The 5GNR radio resides in DU circuitry 702. Network applications 703 in DU circuitry 701 and network applications 704 in DU circuitry 702 comprise PHY modules and MAC modules. For the UL, the 5GNR/LTE/WIFI PHY components process and transfer UL data and signaling to the 5GNR/LTE/WIFI MAC components. The 5GNR/LTE/WIFI MAC components process and transfer UL data and signaling to 5GNR/LTE/WIFI RLC components in CU circuitry 112 over data links 122.

In DU circuitry 701-702, the 5GNR/LTE/WIFI MAC components receive DL data and signaling from the 5GNR/LTE/WIFI RLC components in CU circuitry 112 over data links 122. The 5GNR/LTE/WIFI MAC components process and transfer DL data and signaling to the 5GNR/LTE/WIFI PHY components. The 5GNR/LTE/WIFI PHY components process and transfer DL data and signaling to UE 101 over wireless links 121.

Figure 8:
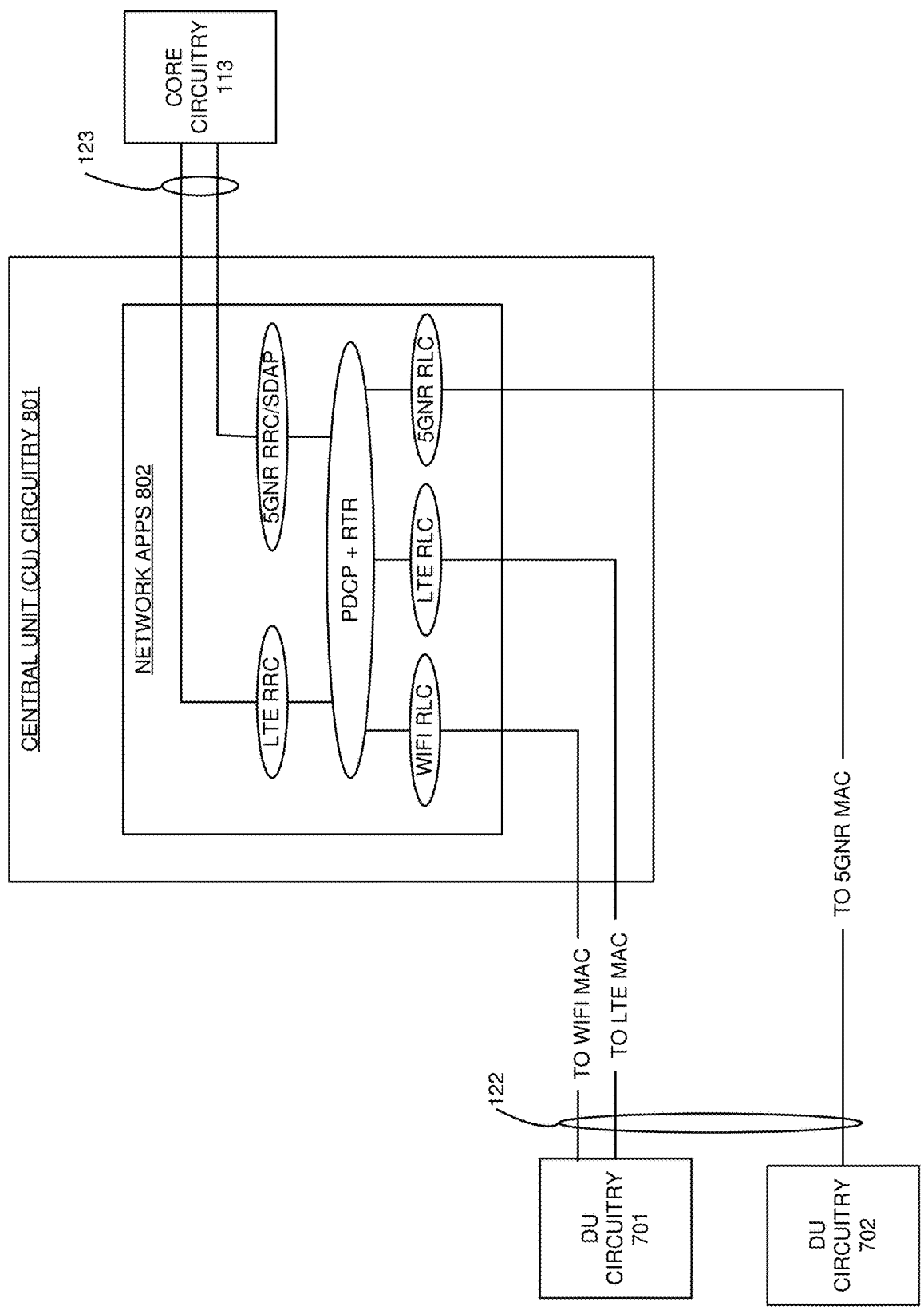
FIG. 8 illustrates alternative CU circuitry.

FIG. 8 illustrates alternative CU circuitry 801 that exchanges data between wireless DU circuitry 111 and core circuitry 113. Network applications 801 comprise a 5GNR RLC module, LTE RLC module, WIFI RLC module, integrated multi-protocol PDCP module, 5GNR RRC/SDAP module, and LTE RRC module. The RLC, PDCP, SDAP, and RRC modules that are being executed by the CPU circuitry in CU circuitry 112 are referred to as components. Advantageously, the PDCP component includes a multi-protocol router (RTR).

The 5GNR/LTE/WIFI RLC components process and transfer UL data to the PDCP component. Advantageously, PDU-RB/SDU mapping by the PDCP component implements various multi-protocol routings. The PDCP component processes and transfers the UL data to the 5GNR RRC/SDAP component and the LTE RRC component. The 5GNR RRC/SDAP component and the LTE RRC component process and transfer UL data and signaling to core circuitry 113 over data links 123.

On the DL, the 5GNR RRC/SDAP component and the LTE RRC component each receive DL data and signaling from core circuitry 113. The 5GNR RRC/SDAP component and the LTE RRC component process and transfer DL data and signaling to the integrated PDCP component. Advantageously, the SDU/PDU-RB mapping by the PDCP component implements various multi-protocol routings. The PDCP component processes and transfers DL data and signaling to the 5GNR/LTE/WIFI RLC components. The 5GNR/LTE/WIFI RLC components in DU circuitry 111 process and transfer the DL data and signaling to their corresponding 5GNR/LTE/WIFI MAC components in DU circuitry 701-702 over data links 122.

Figure 9:
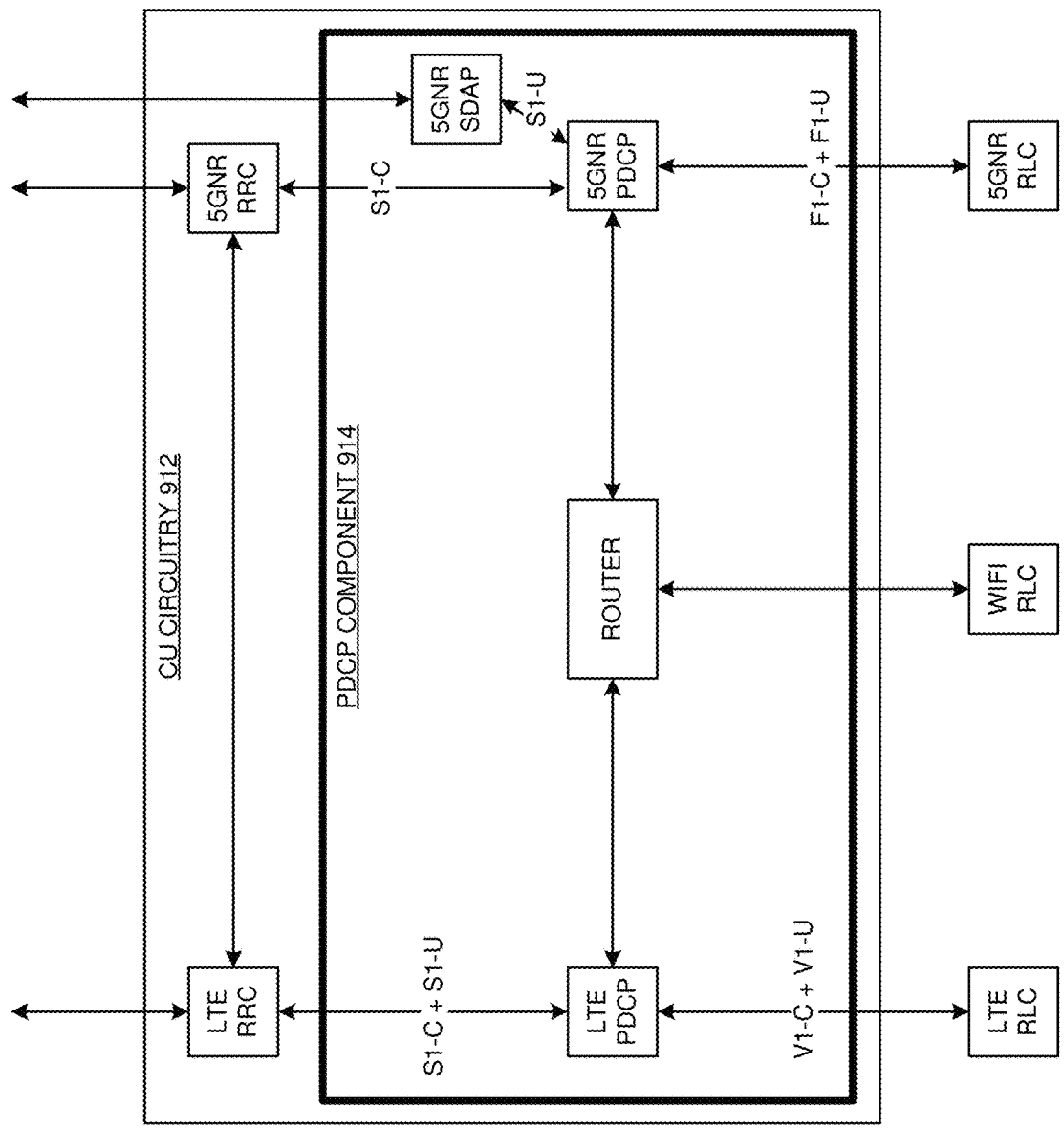
FIG. 9 illustrates an integrated multi-protocol PDCP component in CU circuitry.

FIG. 9 illustrates integrated multi-protocol integrated PDCP component 914 executing in CU circuitry 912. PDCP component 914 is exemplary and CU circuitry 112 may use other PDCP components. PDCP component 914 comprises a router, LTE PDCP component, 5GNR PDCP component, and 5GNR SDAP component. The LTE PDCP component is coupled to the LTE RLC component over V1-C and V1-U links and to the LTE RRC component over S1-C and S1-U links. The 5GNR PDCP component is coupled to the 5GNR RLC component over F1-C and F1-U links, to the 5GNR RRC component over S1-C links, and to the 5GNR SDAP component over S1-U links. The router is coupled to the LTE PDCP component, 5GNR PDCP component, and WIFI RLC component.

On the LTE DL, the LTE RRC component transfers LTE DL data and signaling to the LTE PDCP component. The LTE PDCP component formats some LTE DL data and signaling into WIFI data and signaling for the WIFI RLC component. The LTE PDCP transfers the WIFI DL data and signaling to the WIFI RLC component over the router. The LTE PDCP component formats some LTE DL data and signaling into 5GNR data and signaling for the 5GNR PDCP component. The LTE PDCP transfers the 5GNR DL data and signaling to the 5GNR PDCP component over the router. The LTE PDCP component transfers some LTE data and signaling to the LTE RLC component.

On the 5GNR DL, the 5GNR RRC component transfers LTE DL signaling to the 5GNR PDCP component. The 5GNR SDAP component transfers 5GNR DL data to the 5GNR PDCP component. The 5GNR PDCP component formats some 5GNR DL data and signaling into WIFI data and signaling for the WIFI RLC component. The 5GNR PDCP transfers the WIFI DL data and signaling to the WIFI RLC component over the router. The 5GNR PDCP component formats some 5GNR DL data and signaling into LTE data and signaling for the LTE PDCP component. The 5GNR PDCP transfers the LTE DL data and signaling to the LTE PDCP component over the router. The 5GNR PDCP component transfers some 5GNR data and signaling to the 5GNR RLC component.

On the 5GNR UL, the 5GNR PDCP component receives 5GNR UL data and signaling from the 5GNR RLC component. The 5GNR PDCP component receives WIFI UL data and signaling from the WIFI RLC component and formats the WIFI data and signaling into 5GNR data and signaling for the 5GNR PDCP component. The 5GNR PDCP component formats some 5GNR UL data and signaling for the LTE PDCP component and transfers the LTE UL data and signaling to the LTE PDCP component over the router. The 5GNR PDCP component routes some 5GNR UL data to the 5GNR SDAP component and some 5GNR UL signaling to the 5GNR RRC component.

On the WIFI UL, the WIFI RLC component transfers some WIFI UL data and signaling to the 5GNR PDCP component over the router. The 5GNR PDCP component reformats the WIFI data and signaling for the 5GNR PDCP component and processes the 5GNR data and signaling. The WIFI RLC component transfers some WIFI UL data and signaling to the LTE PDCP component over the router. The LTE PDCP component reformats the WIFI data and signaling for the LTE PDCP component and processes the LTE data and signaling.

On the LTE UL, the LTE PDCP component receives LTE UL data and signaling from the LTE RLC component and the 5GNR PDCP component. The LTE PDCP component receives WIFI UL data and signaling from the WIFI RLC component and formats the WIFI data and signaling into LTE data and signaling for the LTE PDCP component. The LTE PDCP component formats some LTE UL data and signaling for the 5GNR PDCP component and transfers the 5GNR UL data and signaling to the 5GNR PDCP component over the router. The LTE PDCP component routes some LTE UL data and signaling to the LTE RRC component.

Figure 10:
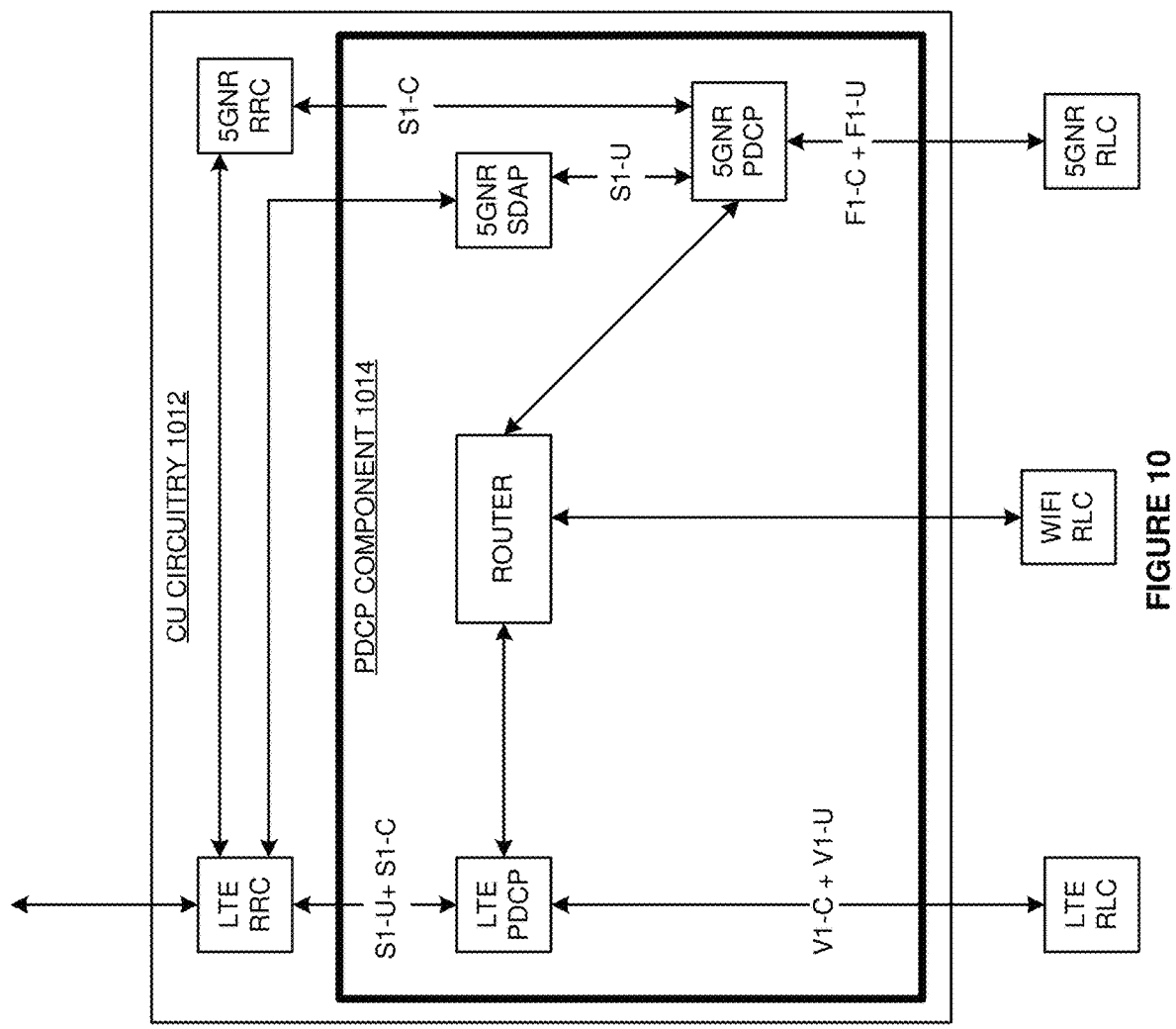
FIG. 10 illustrates an alternative integrated PDCP component in CU circuitry.

FIG. 10 illustrates integrated multi-protocol integrated PDCP component 1014 executing in CU circuitry 1012. PDCP component 1014 is exemplary and CU circuitry 112 may use other PDCP components. PDCP component 1014 comprises a router, LTE PDCP component, 5GNR PDCP component, and 5GNR SDAP component. The LTE and 5GNR RRC components are coupled. The LTE PDCP component is coupled to the LTE RLC component over V1-C and V1-U links and to the LTE RRC component over S1-C and S1-U links. The 5GNR PDCP component is coupled to the 5GNR RLC component over F1-C and F1-U links. The 5GNR PDCP component is coupled to the 5GNR RRC component over S1-C links. The 5GNR PDCP component is coupled to the 5GNR SDAP component over S1-U links. The router is coupled to the LTE PDCP component, 5GNR PDCP component, and WIFI RLC component.

On the LTE DL, the LTE RRC component transfers LTE DL data and signaling to the LTE PDCP component. The LTE PDCP component formats some LTE DL data and signaling into WIFI DL data and signaling for the WIFI RLC component. The LTE PDCP transfers the WIFI DL data and signaling to the WIFI RLC component over the router. The LTE PDCP component formats some LTE DL data and signaling into 5GNR DL data and signaling for the 5GNR PDCP component. The LTE PDCP transfers the 5GNR DL data and signaling to the 5GNR PDCP component over the router. The LTE PDCP component transfers some LTE DL data and signaling to the LTE RLC component.

On the 5GNR DL, the LTE RRC component transfers 5GNR DL data to the 5GNR SDAP component and transfers 5GNR DL signaling to the 5GNR RRC component. The 5GNR RRC component processes the 5GNR DL signaling and transfers 5GNR DL signaling to the 5GNR PDCP component. The 5GNR SDAP component processes the 5GNR DL data and transfers 5GNR DL data to the 5GNR PDCP component. The 5GNR PDCP receives 5GNR DL data and signaling from the LTE PDCP component, the 5GNR RRC component, and the 5GNR SDAP component. The 5GNR PDCP component formats some 5GNR DL data and signaling for the WIFI RLC component and transfers the WIFI DL data and signaling to the WIFI RLC component over the router. The 5GNR PDCP component formats some 5GNR DL data and signaling for the LTE PDCP component and transfers the LTE DL data and signaling to the LTE PDCP component over the router. The 5GNR PDCP component transfers some 5GNR DL data and signaling to the 5GNR RLC component.

On the 5GNR UL, the 5GNR PDCP component receives 5GNR UL data and signaling from the 5GNR RLC component and the LTE PDCP component. The 5GNR PDCP component receives WIFI UL data and signaling from the WIFI RLC component and formats the WIFI data and signaling into 5GNR UL data and signaling for the 5GNR PDCP component. The 5GNR PDCP component formats some 5GNR UL data and signaling for the LTE PDCP component and transfers the LTE UL data and signaling to the LTE PDCP component over the router. The 5GNR PDCP component routes some 5GNR UL data to the 5GNR SDAP component and some 5GNR UL signaling to the 5GNR RRC component. The 5GNR RRC component transfers 5GNR UL signaling to the LTE RRC component. The 5GNR SDAP component transfers 5GNR UL data to the LTE RRC component.

On the LTE UL, the LTE PDCP component receives LTE UL data and signaling from the LTE RLC component and the 5GNR PDCP component. The LTE PDCP component receives WIFI UL data and signaling from the WIFI RLC component and formats the WIFI data and signaling into LTE data and signaling for the LTE PDCP component. The LTE PDCP component formats some LTE UL data and signaling for the 5GNR PDCP component and transfers the 5GNR UL data and signaling to the 5GNR PDCP component over the router. The LTE PDCP component routes some LTE UL data and signaling to the LTE RRC component.

On the WIFI UL, the WIFI RLC component transfers some WIFI UL data and signaling to the 5GNR PDCP component over the router. The 5GNR PDCP component reformats the WIFI UL data and signaling for the 5GNR PDCP component and processes the 5GNR UL data and signaling. The WIFI RLC component transfers some WIFI UL data and signaling to the LTE PDCP component over the router. The LTE PDCP component reformats the WIFI data and signaling for the LTE PDCP component and processes the LTE data and signaling.

Note that the integrated PDCP component described herein comprises a single PDCP software application executing in CU circuitry. Thus, the LTE PDCP component, 5GNR PDCP component, and router component share the same Application Programming Interface (API) to the same operating system. In some examples, the operating system has a single API to a single virtual machine. Thus, the CU circuitry may execute an integrated PDCP virtual machine that features an optimized API and operating system to efficiently and effectively support a set of multi-protocol PDCP components.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating Central Unit (CU) circuitry in a wireless data network to serve wireless User Equipment (UE) with an integrated Packet Data Convergence Protocol (PDCP) module, the method comprising:
   the CU circuitry receiving and storing Downlink (DL) data from a Fifth Generation New Radio (5GNR) Service Data Adaption Protocol (SDAP) component in a 5GNR RRC receive memory;
   the CU circuitry executing the integrated PDCP module, load balancing the DL data between an Institute of Electrical and Electronic Engineers 802.11 (WIFI) Radio Link Control (RLC) component and a 5GNR RLC component, and responsively routing the DL data from the 5GNR RRC receive memory to a WIFI RLC transmit memory;
   CU circuitry executing the integrated PDCP module and responsively sequencing the DL data based on DL sequence numbering and compressing DL headers in the DL data;
   the CU circuitry transmitting the DL data from the WIFI RLC transmit memory to the WIFI RLC component;
   the CU circuitry receiving and storing Uplink (UL) data from the WIFI RLC component in a WIFI RLC receive memory;
   the CU circuitry executing the integrated PDCP module, load balancing the UL data between the 5GNR SDAP component and a Long Term Evolution (LTE) RRC component, and responsively routing the UL data from the WIFI RLC receive memory to a 5GNR RRC transmit memory;
   CU circuitry executing the integrated PDCP module and responsively sequencing the UL data based on UL sequence numbering and decompressing UL headers in the UL data; and
   the CU circuitry transmitting the UL data from the 5GNR RRC transmit memory to the 5GNR SDAP component.

2. The method of claim 1 further comprising:
   the CU circuitry receiving and storing additional DL data from the 5G SDAP component in the 5GNR RRC receive memory;
   the CU circuitry executing the integrated PDCP module and responsively routing the additional DL data from the 5GNR RRC receive memory to an LTE RLC transmit memory; and
   the CU circuitry transmitting the additional DL user data from the LTE RLC transmit memory to the LTE RLC component;
   the CU circuitry receiving and storing additional UL data from the LTE RLC component in an LTE RLC receive memory;
   the CU circuitry executing the integrated PDCP module and responsively routing the additional UL data from the LTE RLC receive memory to the 5GNR RRC transmit memory; and
   the CU circuitry transmitting the additional UL data from the 5GNR RRC transmit memory to the 5GNR SDAP component.

3. The method of claim 1 further comprising:
   the CU circuitry receiving and storing additional DL data from the LTE RRC component in a LTE RRC receive memory;
   the CU circuitry executing the integrated PDCP module and responsively routing the additional DL data from the LTE RRC receive memory to a 5GNR RLC transmit memory;
   the CU circuitry transmitting the additional DL user data from the 5GNR RLC transmit memory to the 5GNR RLC component;
   the CU circuitry receiving and storing additional UL data from the 5GNR RLC component in a 5GNR RLC receive memory;
   the CU circuitry executing the integrated PDCP module and responsively routing the additional UL data from the 5GNR RLC receive memory to an LTE RRC transmit memory; and the CU circuitry transmitting the additional UL data from the LTE RRC transmit memory to the LTE RRC component.

4. The method of claim 1 further comprising:
   the CU circuitry receiving and storing additional DL data from the LTE RRC component in an LTE RRC receive memory;
   the CU circuitry executing the integrated PDCP module and responsively routing the additional DL data from the LTE RRC receive memory to the WIFI RLC transmit memory;
   the CU circuitry transmitting the additional DL data from the WIFI RLC transmit memory to the WIFI RLC component;
   the CU circuitry receiving and storing additional UL data from the WIFI RLC component in the WIFI RLC receive memory;

the CU circuitry executing the integrated PDCP module and responsively routing the additional UL data from the WIFI RLC receive memory to an LTE RRC transmit memory; and the CU circuitry transmitting the additional UL data from the LTE RRC transmit memory to the LTE RRC component.

5. The method of claim 1 further comprising:

the CU circuitry executing the integrated PDCP module and responsively receiving signaling from a 5GNR RRC component for the DL data and for the UL data;

wherein routing the DL data comprises routing the DL data from the 5G RRC receive memory to the WIFI RLC transmit memory responsive to the signaling; and wherein routing the UL data comprises routing the UL data from the WIFI RLC receive memory to the 5GNR RRC transmit memory responsive to the signaling.

6. The method of claim 1 further comprising the CU circuitry executing the integrated PDCP module and responsively receiving signaling from the LTE RRC component for the DL data and for the UL data;

wherein routing the DL data comprises routing the DL data from the 5G RRC receive memory to the WIFI RLC transmit memory responsive to the signaling; and wherein routing the UL data comprises routing the UL data from the WIFI RLC receive memory to the 5GNR RRC transmit memory responsive to the signaling.

7. Central Unit (CU) circuitry in a wireless data network to serve wireless User Equipment (UE) with an integrated Packet Data Convergence Protocol (PDCP) module, the CU circuitry comprising:

data memory circuitry comprising a Fifth Generation New Radio (5GNR) Radio Resource Control (RRC) receive memory, a 5GNR RRC transmit memory, an Institute of Electrical and Electronic Engineers 802.11 (WIFI) Radio Link Control (RLC) receive memory, and a WIFI RLC transmit memory;

data communication circuitry configured to receive and store Downlink (DL) data from a 5GNR Service Data Adaption Protocol (SDAP) component in the 5GNR RRC receive memory and to receive and store Uplink (UL) data from a WIFI RLC component in the WIFI RLC receive memory;

data processing circuitry configured to execute the integrated PDCP module, load balance the DL data between the WIFI RLC component and a 5GNR RLC component, route the DL data from the 5GNR RRC receive memory to the WIFI RLC transmit memory, sequence the DL data based on DL sequence numbering, compress DL headers in the DL data, load balance the UL data between the 5GNR SDAP component memory and a Long Term Evolution (LTE) RRC component in the WIFI RLC receive memory, route the UL data from the WIFI RLC receive memory to the 5GNR RRC transmit memory, sequence the UL data based on UL sequence numbering, and decompress UL headers in the UL data; and the data communication circuitry configured to transmit the DL data from the WIFI RLC transmit memory to the WIFI RLC component and to transmit the UL data from the 5GNR RRC transmit memory to the 5GNR SDAP component.

8. The CU circuitry of claim 7 further comprising:

the data communication circuitry configured to receive and store additional DL data from the 5G SDAP component in the 5GNR RRC receive memory;

the data processing circuitry configured to execute the integrated PDCP module and responsively route the additional DL data from the 5GNR RRC receive memory to an LTE RLC transmit memory; and the data communication circuitry configured to transmit the additional DL user data from the LTE RLC transmit memory to the LTE RLC component;

the data communication circuitry configured to receive and store additional UL data from the LTE RLC component in an LTE RLC receive memory;

the data processing circuitry configured to execute the integrated PDCP module and responsively route the additional UL data from the LTE RLC receive memory to the 5GNR RRC transmit memory; and the data communication circuitry configured to transmit the additional UL data from the 5GNR RRC transmit memory to the 5GNR SDAP component.

9. The CU circuitry of claim 7 further comprising:

the data communication circuitry configured to receive and store additional DL data from the LTE RRC component in a LTE RRC receive memory;

the data processing circuitry configured to execute the integrated PDCP module and responsively route the additional DL data from the LTE RRC receive memory to a 5GNR RLC transmit memory;

the data communication circuitry configured to transmit the additional DL user data from the 5GNR RLC transmit memory to the 5GNR RLC component;

the data communication circuitry configured to receive and store additional UL data from the 5GNR RLC component in a 5GNR RLC receive memory;

the data processing circuitry configured to execute the integrated PDCP module and responsively route the additional UL data from the 5GNR RLC receive memory to an LTE RRC transmit memory; and the data communication circuitry configured to transmit the additional UL data from the LTE RRC transmit memory to the LTE RRC component.

10. The CU circuitry of claim 7 further comprising:

the data communication circuitry configured to receive and store additional DL data from the LTE RRC component in an LTE RRC receive memory;

the data processing circuitry configured to execute the integrated PDCP module and responsively route the additional DL data from the LTE RRC receive memory to the WIFI RLC transmit memory;

the data communication circuitry configured to transmit the additional DL data from the WIFI RLC transmit memory to the WIFI RLC component;

the data communication circuitry configured to receive and store additional UL data from the WIFI RLC component in the WIFI RLC receive memory;

the data processing circuitry configured to execute the integrated PDCP module and responsively route the additional UL data from the WIFI RLC receive memory to an LTE RRC transmit memory; and the data communication circuitry configured to transmit the additional UL data from the LTE RRC transmit memory to the LTE RRC component.

11. The CU circuitry of claim 7 further comprising:

the data processing circuitry is configured to executing the integrated PDCP module and responsively receive signaling from a 5GNR RRC component for the DL data and for the UL data;

the data processing circuitry is configured to route the DL data from the 5G RRC receive memory to the WIFI RLC transmit memory responsive to the signaling; and the data processing circuitry is configured to route the UL data from the WIFI RLC receive memory to the 5GNR RRC transmit memory responsive to the signaling.

12. The CU circuitry of claim 7 further comprising
the data processing circuitry configured to execute the integrated PDCP module and responsively receive signaling from the RRC component for the DL data and for the UL data;
the data processing circuitry configured to route the DL data from the 5G RRC receive memory to the WIFI RLC transmit memory responsive to the signaling; and
the data processing circuitry configured to route the UL data from the WIFI RLC receive memory to the 5GNR RRC transmit memory responsive to the signaling.

* * * * *